(12) United States Patent
Hakura et al.

(10) Patent No.: US 8,542,247 B1
(45) Date of Patent: Sep. 24, 2013

(54) CULL BEFORE VERTEX ATTRIBUTE FETCH AND VERTEX LIGHTING

(75) Inventors: Ziyad S. Hakura, Mountain View, CA (US); John Erik Lindholm, Saratoga, CA (US); Emmett M. Kilgariff, San Jose, CA (US); Robert Ohannessian, Austin, TX (US); Scott R. Whitman, Saratoga, CA (US); James C. Bowman, Pescadero, CA (US); Patrick R. Brown, Raleigh, NC (US); Ross A. Cunniff, Fort Collins, CO (US)

(73) Assignee: Nvidia Corporation, Santa Clara, CA (US)

( * ) Notice: Subject to any disclaimer, the term of this patent is extended or adjusted under 35 U.S.C. 154(b) by 961 days.

(21) Appl. No.: 12/505,398

(22) Filed: Jul. 17, 2009

(51) Int. Cl.
G09G 5/00 (2006.01)

(52) U.S. Cl.
USPC .......................................................... 345/620

(58) Field of Classification Search
USPC .......................................................... 345/620
See application file for complete search history.

(56) References Cited

U.S. PATENT DOCUMENTS

| | | |
|---|---|---|
| 4,375,683 A | 3/1983 | Wensley |
| 4,967,347 A | 10/1990 | Smith et al. |
| 5,103,478 A | 4/1992 | Matyas et al. |
| 5,233,615 A | 8/1993 | Goetz |
| 5,339,404 A | 8/1994 | Vandling, III |
| 5,572,620 A | 11/1996 | Reilly et al. |
| 5,845,060 A | 12/1998 | Vrba et al. |
| 6,023,751 A | 2/2000 | Schlansker et al. |
| 6,128,755 A | 10/2000 | Bello et al. |
| 6,151,684 A | 11/2000 | Alexander et al. |
| 6,769,121 B1 | 7/2004 | Koyama et al. |
| 6,910,173 B2 | 6/2005 | Mitra et al. |
| 6,943,797 B2 | 9/2005 | Wasserman et al. |
| 6,950,927 B1 | 9/2005 | Apisdorf et al. |
| 6,967,664 B1 | 11/2005 | Taylor et al. |
| 7,047,440 B1 | 5/2006 | Freydel et al. |
| 7,065,672 B2 | 6/2006 | Long et al. |

(Continued)

FOREIGN PATENT DOCUMENTS

| | | |
|---|---|---|
| WO | WO 2008/127610 | 10/2008 |
| WO | WO 2008/127622 | 10/2008 |
| WO | WO 2008/127623 | 10/2008 |

OTHER PUBLICATIONS

Office Action in U.S. Appl. No. 12/054,322, mailed May 19, 2011.

(Continued)

*Primary Examiner* — Xiao M. Wu
*Assistant Examiner* — Scott E Sonners
(74) *Attorney, Agent, or Firm* — Patterson & Sheridan, L.L.P.

(57) ABSTRACT

One embodiment of the invention sets forth a mechanism for compiling a vertex shader program into two portions, a culling portion and a shading portion. The culling portion of the compiled vertex shader program specifies vertex attributes and instructions of the vertex shader program needed to determine whether early vertex culling operations should be performed on a batch of vertices associated with one or more primitives of a graphics scene. The shading portion of the compiled vertex shader program specifies the remaining vertex attributes and instructions of the vertex shader program for performing vertex lighting and performing other operations on the vertices in the batch of vertices. When the compiled vertex shader program is executed by graphics processing hardware, the shading portion of the compiled vertex shader is executed only when early vertex culling operations are not performed on the batch of vertices.

22 Claims, 11 Drawing Sheets

(56) References Cited

U.S. PATENT DOCUMENTS

| | | | |
|---|---|---|---|
| 7,203,878 | B2 | 4/2007 | Naegle et al. |
| 7,292,239 | B1 * | 11/2007 | Moreton et al. ............. 345/419 |
| 7,315,310 | B2 | 1/2008 | Sakamoto et al. |
| 7,392,426 | B2 | 6/2008 | Wolfe et al. |
| 7,466,322 | B1 | 12/2008 | Moreton et al. |
| 7,468,726 | B1 | 12/2008 | Wloka et al. |
| 7,627,723 | B1 | 12/2009 | Buck et al. |
| 7,746,355 | B1 | 6/2010 | Cai et al. |
| 8,108,872 | B1 | 1/2012 | Lindholm et al. |
| 2001/0025295 | A1 | 9/2001 | Kawachiya et al. |
| 2001/0034824 | A1 | 10/2001 | Mukherjee et al. |
| 2002/0105519 | A1 | 8/2002 | Lindholm et al. |
| 2002/0152419 | A1 | 10/2002 | McLoughlin et al. |
| 2003/0131291 | A1 | 7/2003 | Morrison et al. |
| 2003/0189565 | A1 | 10/2003 | Lindholm et al. |
| 2004/0034856 | A1 | 2/2004 | Boudnik et al. |
| 2004/0189650 | A1 | 9/2004 | Deering |
| 2004/0263520 | A1 | 12/2004 | Wasserman et al. |
| 2005/0216798 | A1 | 9/2005 | Yu |
| 2005/0278567 | A1 | 12/2005 | Wolfe et al. |
| 2006/0150186 | A1 | 7/2006 | Grayver |
| 2007/0094669 | A1 | 4/2007 | Rector et al. |
| 2007/0165035 | A1 | 7/2007 | Duluk et al. |
| 2007/0198792 | A1 | 8/2007 | Dice et al. |
| 2007/0206027 | A1 | 9/2007 | Chen |
| 2007/0260939 | A1 | 11/2007 | Kammann et al. |
| 2008/0094412 | A1 | 4/2008 | Jiao et al. |
| 2008/0143730 | A1 | 6/2008 | Lindholm et al. |
| 2008/0162770 | A1 | 7/2008 | Titiano et al. |
| 2008/0184211 | A1 | 7/2008 | Nickolls et al. |
| 2008/0220545 | A1 | 9/2008 | Pelley |
| 2009/0002393 | A1 | 1/2009 | Wang |
| 2009/0048857 | A1 | 2/2009 | Pepper |
| 2009/0132878 | A1 | 5/2009 | Garland et al. |

OTHER PUBLICATIONS

Office Action, U.S. Appl. No. 12/054,322 dated Dec. 14, 2010.
Office Action, U.S. Appl. No. 12/324,645 dated Dec. 14, 2010.
Moss, et al. "Toward Acceleration of RSA Using 3D Graphics Hardware," LNCS 4887, Dec. 2007, pp. 369-388.
Eggers, et al. "Simultaneous Multithreading: A Platform for Next-Generation Processors," IEEE Micro, vol. 17, No. 5, pp. 12-19, Sep./Oct. 1997.
Office Action, U.S. Appl. No. 13/485,622, dated Feb. 11, 2013.
Office Action, U.S. Appl. No. 12/579,348, dated May 24, 2012.
Office Action, U.S. Appl. No. 12/579,352 dated Jan. 3, 2013.
Office Action, U.S. Appl. No. 13/485,622, dated Aug. 27, 2012.

* cited by examiner

CULL BEFORE VERTEX ATTRIBUTE FETCH AND VERTEX LIGHTING

BACKGROUND OF THE INVENTION

1. Field of the Invention

The present invention relates generally to the field of graphics processing and, more specifically, to culling before vertex attribute fetch and vertex lighting.

2. Description of the Related Art

A graphics processing pipeline of a graphics processing unit (GPU) accepts a representation of a three-dimensional (3D) scene as an input and processes that input to produce a 2D display image of the scene as an output. As is well known, the 3D graphics scene is typically represented by a collection of primitives having vertices. Indices associated with the vertices are stored in index arrays, and vertex data associated with those vertices is stored in vertex arrays. The primitives are individually processed by the GPU based on the index arrays and the vertex data when generating the 2D display image of the scene.

FIG. 1 is a conceptual diagram different stages in a graphics processing pipeline 100 of a GPU through which the primitives associated with a graphics scene are processed when generating the 2D display image of the graphics scene. The graphics processing pipeline 100 includes a host unit 102, a front end unit 104, an index fetch unit 106, a vertex fetch unit 108, a vertex shader 110 and a geometry shader 112. The graphics processing pipeline 100 also includes a viewport cull (VPC) unit 114, a rasterizer 116, a pixel shader 118, a raster operations unit (ROP) 120 and a frame buffer 122.

The host unit 102 transmits the vertex data and the index arrays associated with the vertices of the various primitives making up the 3D graphics scene to an L2 cache within the GPU or the frame buffer 122 for storage. The host unit 102 also transmits graphics commands for processing the vertex data associated with those vertices to the front end unit 104, which, in turn, distributes graphics processing commands to the index fetch unit 106. For a given set of vertices being processed, the index fetch unit 106 retrieves the index arrays associated with those vertices and creates a batch of vertices selected for processing. The index fetch unit 106 then transmits the batch of unique vertices to the vertex fetch unit 108.

Upon receiving a batch of vertices, the vertex fetch unit 108 fetches the vertex attributes included in the vertex data associated with each vertex in the batch of vertices from the frame buffer 102. The vertex fetch unit 108 transmits the vertex attributes to the vertex shader 110 for further processing. The vertex shader 110 is a programmable execution unit that is configured to execute vertex shader programs for lighting and transforming vertices included in the batch of vertices. The vertex shader 110 transmits the processed batch of vertices to the tessellation control shader 111.

The tessellation control shader (TCS) 111 operates on a patch of control vertices and computes vertex attributes for each control vertex of the patch. The TCS 111 also produces a set of level of details (LODs) associated with the patch that can be used to generate a tessellated surface. The tessellation evaluation shader (TES) 112 operates on the vertices of the tessellated surface and computes vertex attributes for each vertex of the tessellated surface. The vertices are then processed by the geometry shader 113. The geometry shader 113 is a programmable execution unit that is configured to execute geometry shader programs for generating graphics primitives and calculate parameters that are used to rasterize the graphics primitives. The geometry shader 113 then transmits the generated primitives to the viewport cull unit 114.

The viewport cull unit 114 performs clipping, culling, viewport transform, and attribute perspective correction operations on the primitives. The viewport cull unit 114 can perform different culling and clipping techniques to remove primitives within the 3D graphics scene that are not visible in the view frustum. The remaining primitives (those that are not culled) are transmitted by the viewport cull unit 114 to the rasterizer 116. The rasterizer 116 rasterizes the remaining primitives into pixels in 2D screen space and then the pixel shader 118 shades the pixels. The ROP 120 is a processing unit that performs raster operations, such as stencil, z test, blending, and the like, and outputs pixel data as processed graphics data for storage in graphics memory. The processed graphics data may be stored in graphics memory, e.g., the frame buffer 122 for further processing and/or display.

One drawback of conventional graphics processing pipelines, like graphics processing pipeline 100, is that all the vertex attributes associated with a batch of vertices being processed are retrieved from the frame buffer 122, even if the primitives associated with the batch of vertices are later culled downstream of the vertex fetch unit 108 by the viewport cull unit 114. In such a scenario, memory bandwidth is wasted unnecessarily to retrieve vertex attributes for vertices that are discarded at a later stage in the graphics processing pipeline. Similarly, the vertex shader 110 and the geometry shader 112 process vertex data associated with all the vertices in a batch even if the primitives associated with that batch of vertices are later culled by the viewport cull unit 114, thereby wasting the processing resources of the GPU.

As the foregoing illustrates, what is needed in the art is a mechanism for identifying vertices that are eventually culled in a later stage of the graphics processing pipeline and filtering those vertices at an earlier stage in the graphics processing pipeline before those vertices are processed.

SUMMARY OF THE INVENTION

One embodiment of the present invention sets forth a method for generating a compiled program configured to allow early culling operations related to one or more primitives in a graphics scene to be performed. The method includes the steps of generating a first portion of the compiled program that includes a first set of instructions specified in an uncompiled program for computing one or more culling attributes related to the one or more primitives and needed to perform the early culling operations related to the one or more primitives and a first set of input attribute identifiers specified in the first set of instructions, and inserting culling instructions into the first portion of the compiled program that, when executed, generate a clip status that is based on the culling attributes associated with the one or more primitives and indicates whether the early culling operations related to the one or more primitives should be performed. The method also includes the step of generating a second portion of the compiled program for performing one or more additional operations on the set of primitives, wherein the second portion includes a second set of instructions specified in the uncompiled program and a second set of input attribute identifiers specified in the second set of instructions.

One advantage of the disclosed method is that batches of vertices associated with primitives being processed within the graphics rendering pipeline that eventually would be culled by the VPC unit are discarded at an earlier stage in the pipeline. Such an approach saves memory bandwidth since vertex attributes associated with the discarded vertices do not need to be retrieved from memory. In addition, early vertex culling reduces computational load on the parallel processing subsystem since the discarded vertices, and, consequently, the primitives associated with those vertices, are not processed unnecessarily by the vertex shader and the geometry shader, respectively.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The approach to early vertex culling described herein allows vertices of one or more primitives being processed within the graphics rendering pipeline (e.g., graphics rendering pipeline 100) that eventually would be culled by the VPC unit 116 to be identified and discarded at an earlier stage in the pipeline. As described in greater detail below, when processing a batch of vertices associated with one or more primitives, each vertex is processed by a different thread of a thread group, and a clip status is generated for each vertex by the thread processing that vertex. In one embodiment, the clip status associated with each vertex in the batch of vertices can then be combined to generate a clip status associated with the batch of vertices. The clip status associated with the batch of vertices can be used to determine whether the batch of vertices should be culled. In alternative embodiments, the clip status associated with each vertex of a specific primitive can be combined to generate a clip status with each of the one or more primtives. The clip status associated with each primitive can then be used to determine whether that primitive should be culled. As persons skilled in the art will understand, the techniques described herein can also be applied to other culling implementations, such as those implemented within the geometry shader, or those implemented within the tessellation shader, or even those implemented at higher levels within the computing architecture.

System Overview

Figure 1:
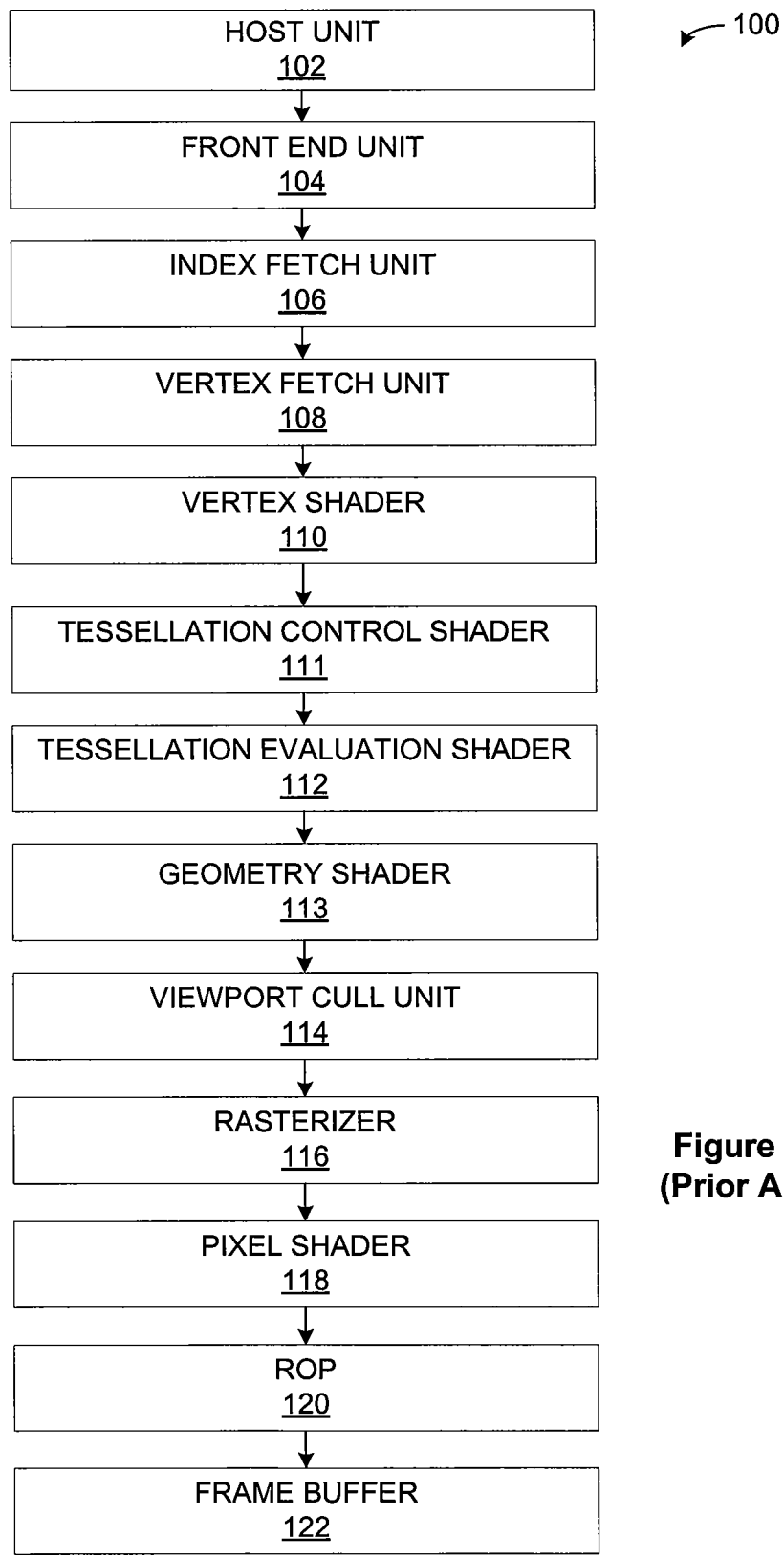
FIG. 1 is a conceptual diagram different stages in a graphics processing pipeline of a GPU through which the primitives associated with a graphics scene are processed when generating the 2D display image of the graphics scene.
Figure 2:
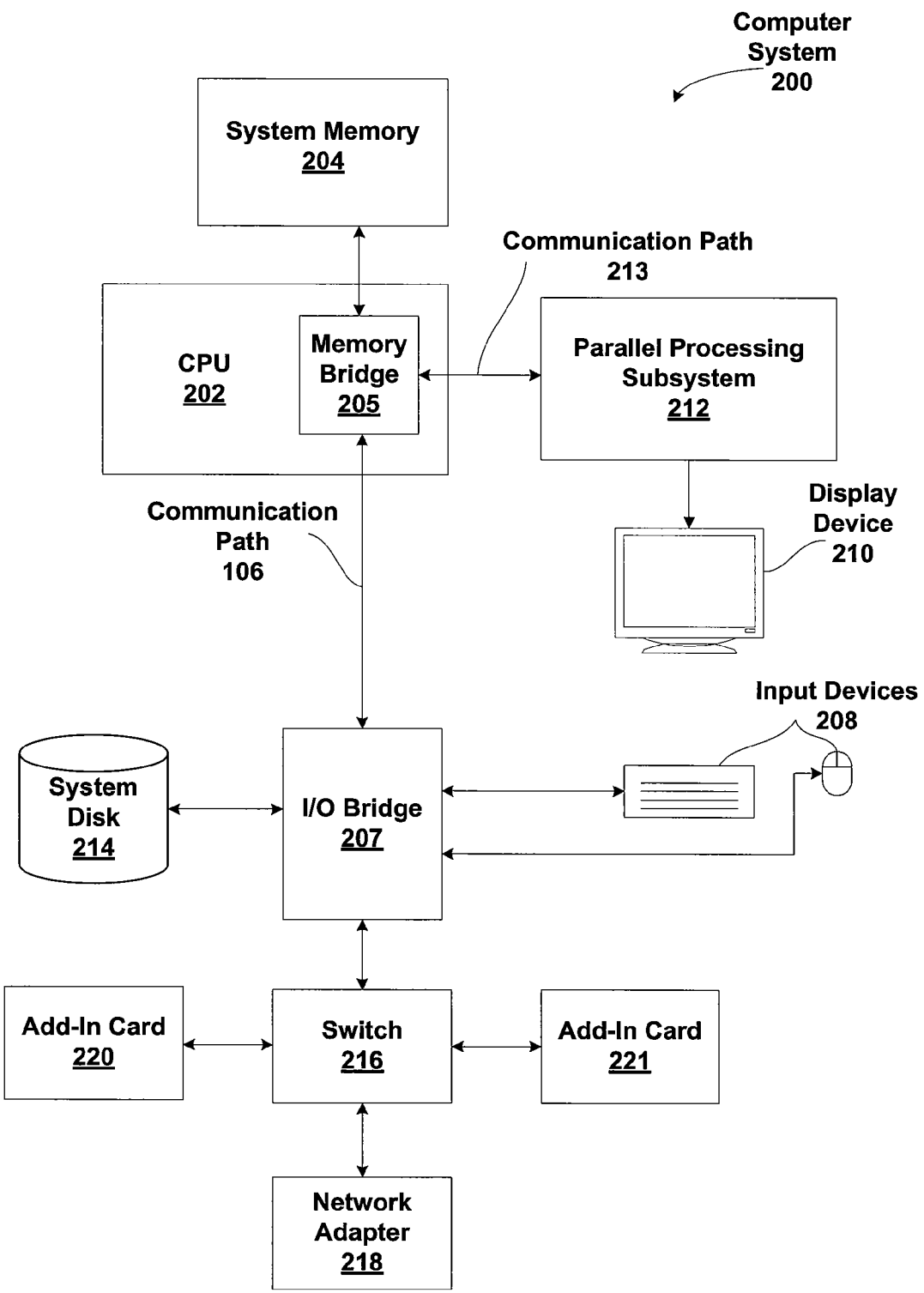
FIG. 2 is a block diagram illustrating a computer system configured to implement one or more aspects of the present invention.

FIG. 2 is a block diagram illustrating a computer system 200 configured to implement one or more aspects of the present invention. Computer system 200 includes a central processing unit (CPU) 202 and a system memory 204 communicating via a bus path through a memory bridge 205. Memory bridge 205 may be integrated into CPU 202 as shown in FIG. 2. Alternatively, memory bridge 205, may be a conventional device, e.g., a Northbridge chip, that is connected via a bus to CPU 202. Memory bridge 205 is connected via communication path 206 (e.g., a HyperTransport link) to an I/O (input/output) bridge 207. I/O bridge 207, which may be, e.g., a Southbridge chip, receives user input from one or more user input devices 208 (e.g., keyboard, mouse) and forwards the input to CPU 202 via path 206 and memory bridge 205. A parallel processing subsystem 212 is coupled to memory bridge 205 via a bus or other communication path 213 (e.g., a PCI Express, Accelerated Graphics Port, or HyperTransport link); in one embodiment parallel processing subsystem 212 is a graphics subsystem that delivers pixels to a display device 210 (e.g., a conventional CRT or LCD based monitor). A system disk 214 is also connected to I/O bridge 207. A switch 216 provides connections between I/O bridge 207 and other components such as a network adapter 218 and various add-in cards 220 and 221. Other components (not explicitly shown), including USB or other port connections, CD drives, DVD drives, film recording devices, and the like, may also be connected to I/O bridge 207. Communication paths interconnecting the various components in FIG. 2 may be implemented using any suitable protocols, such as PCI (Peripheral Component Interconnect), PCI-Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 212 incorporates circuitry optimized for graphics and video processing, including, for example, video output circuitry, and constitutes a graphics processing unit (GPU). In another embodiment, the parallel processing subsystem 212 incorporates circuitry optimized for general purpose processing, while preserving the underlying computational architecture, described in greater detail herein. In yet another embodiment, the parallel processing subsystem 212 may be integrated with one or more other system elements, such as the memory bridge 205, CPU 202, and I/O bridge 207 to form a system on chip (SoC).

It will be appreciated that the system shown herein is illustrative and that variations and modifications are possible. The connection topology, including the number and arrangement of bridges, may be modified as desired. For instance, in some embodiments, system memory 204 is connected to CPU 202 directly rather than through a bridge, and other devices communicate with system memory 204 via memory bridge 205 and CPU 202. In other alternative topologies, parallel processing subsystem 212 is connected to I/O bridge 207 or directly to CPU 202, rather than to memory bridge 205. In still other embodiments, one or more of CPU 202, I/O bridge 207, parallel processing subsystem 212, and memory bridge 205 may be integrated into one or more chips. The particular components shown herein are optional; for instance, any number of add-in cards or peripheral devices might be supported. In some embodiments, switch 216 is eliminated, and network adapter 218 and add-in cards 220, 221 connect directly to I/O bridge 207.

Figure 3:
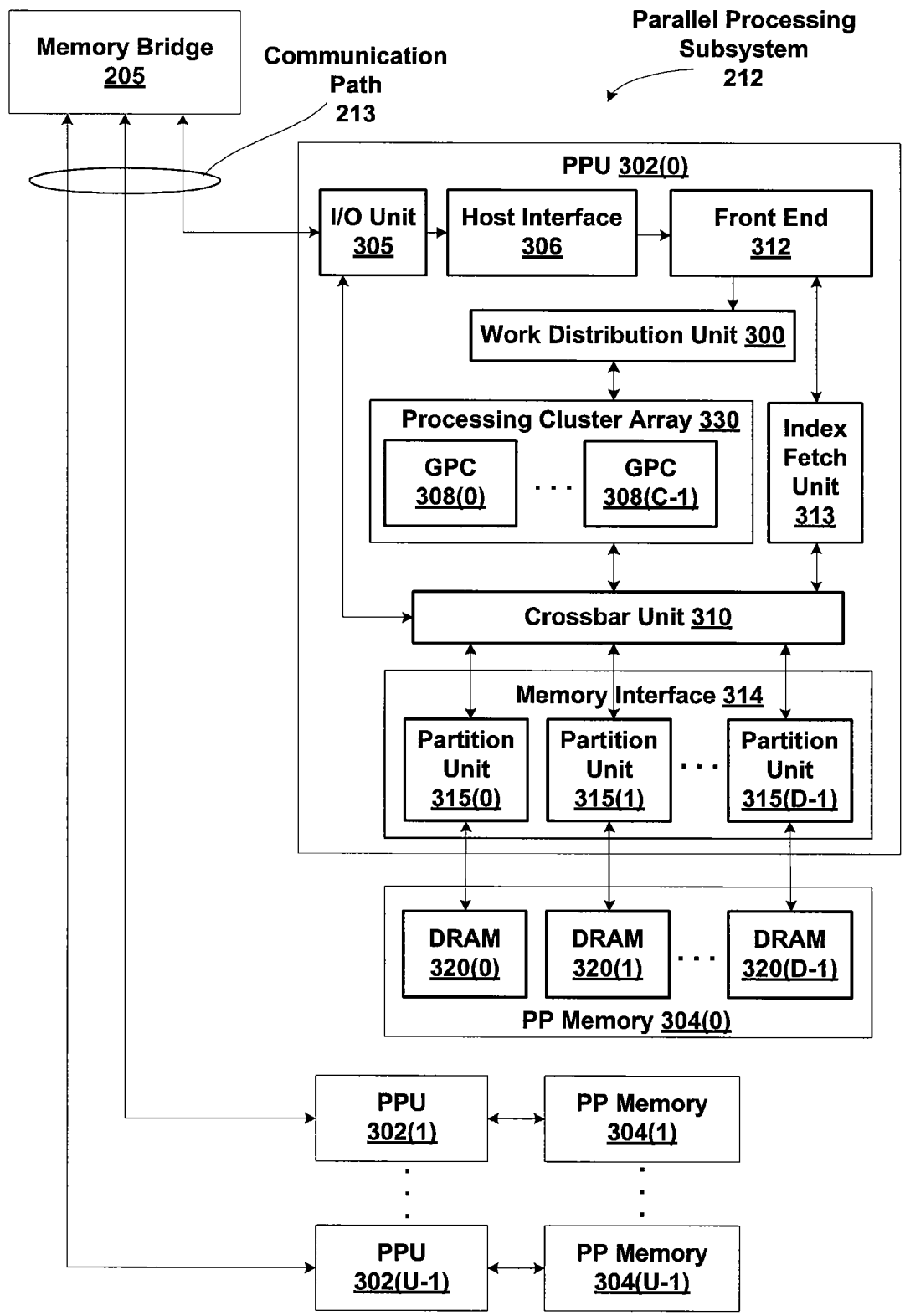
FIG. 3 is a block diagram of a parallel processing subsystem for the computer system of FIG. 1, according to one embodiment of the present invention.

FIG. 3 illustrates a parallel processing subsystem 212, according to one embodiment of the present invention. As shown, parallel processing subsystem 212 includes one or more parallel processing units (PPUs) 302, each of which is coupled to a local parallel processing (PP) memory 304. In general, a parallel processing subsystem includes a number U of PPUs, where $U \geq 1$. (Herein, multiple instances of like objects are denoted with reference numbers identifying the object and parenthetical numbers identifying the instance where needed.) PPUs 302 and parallel processing memories 304 may be implemented using one or more integrated circuit devices, such as programmable processors, application specific integrated circuits (ASICs), or memory devices, or in any other technically feasible fashion.

Referring again to FIG. 2, in some embodiments, some or all of PPUs 302 in parallel processing subsystem 212 are graphics processors with rendering pipelines that can be configured to perform various tasks related to generating pixel data from graphics data supplied by CPU 202 and/or system memory 204, interacting with local parallel processing memory 304 (which can be used as graphics memory including, e.g., a conventional frame buffer) to store and update pixel data, delivering pixel data to display device 210, and the like. In some embodiments, parallel processing subsystem 212 may include one or more PPUs 302 that operate as graphics processors and one or more other PPUs 302 that are used for general-purpose computations. The PPUs may be identical or different, and each PPU may have its own dedicated parallel processing memory device(s) or no dedicated parallel processing memory device(s). One or more PPUs 302 may output data to display device 210 or each PPU 302 may output data to one or more display devices 210.

In operation, CPU 202 is the master processor of computer system 200, controlling and coordinating operations of other system components. In particular, CPU 202 issues commands that control the operation of PPUs 302. In some embodiments, CPU 202 writes a stream of commands for each PPU 302 to a command buffer (not explicitly shown in either FIG. 2 or FIG. 3) that may be located in system memory 204, parallel processing memory 304, or another storage location accessible to both CPU 202 and PPU 302. PPU 302 reads the command stream from the command buffer and then executes commands asynchronously relative to the operation of CPU 202. CPU 202 may also create data buffers that PPUs 302 may read in response to commands in the command buffer. Each command and data buffer may be read by each of PPUs 302.

Referring back now to FIG. 3, each PPU 302 includes an I/O (input/output) unit 305 that communicates with the rest of computer system 200 via communication path 213, which connects to memory bridge 205 (or, in one alternative embodiment, directly to CPU 202). The connection of PPU 302 to the rest of computer system 200 may also be varied. In some embodiments, parallel processing subsystem 212 is implemented as an add-in card that can be inserted into an expansion slot of computer system 200. In other embodiments, a PPU 302 can be integrated on a single chip with a bus bridge, such as memory bridge 205 or I/O bridge 207. In still other embodiments, some or all elements of PPU 302 may be integrated on a single chip with CPU 202.

In one embodiment, communication path 213 is a PCI-Express link, in which dedicated lanes are allocated to each PPU 302, as is known in the art. Other communication paths may also be used. An I/O unit 305 generates packets (or other signals) for transmission on communication path 213 and also receives all incoming packets (or other signals) from communication path 213, directing the incoming packets to appropriate components of PPU 302. For example, commands related to processing tasks may be directed to a host interface 306, while commands related to memory operations (e.g., reading from or writing to parallel processing memory 304) may be directed to a memory crossbar unit 310. Host interface 306 reads each command buffer and outputs the work specified by the command buffer to a front end 312.

Each PPU 302 advantageously implements a highly parallel processing architecture. As shown in detail, PPU 302(0) includes a processing cluster array 330 that includes a number C of general processing clusters (GPCs) 308, where $C \geq 1$. Each GPC 308 is capable of executing a large number (e.g., hundreds or thousands) of threads concurrently, where each thread is an instance of a program. In various applications, different GPCs 308 may be allocated for processing different types of programs or for performing different types of computations. For example, in a graphics application, a first set of GPCs 308 may be allocated to perform tessellation operations and to produce primitive topologies for patches, and a second set of GPCs 308 may be allocated to perform tessellation shading to evaluate patch parameters for the primitive topologies and to determine vertex positions and other per-vertex attributes. The allocation of GPCs 308 may vary depending on the workload arising for each type of program or computation. Alternatively, GPCs 308 may be allocated to perform processing tasks using a time-slice scheme to switch between different processing tasks.

GPCs 308 receive processing tasks to be executed via a work distribution unit 300, which receives commands defining processing tasks from front end unit 312. Processing tasks include pointers to data to be processed, e.g., surface (patch) data, primitive data, vertex data, and/or pixel data, as well as state parameters and commands defining how the data is to be processed (e.g., what program is to be executed). The front end unit 312 transmits requests to the index fetch unit 313 to generate a batch of unique vertices based on the index arrays stored in the DRAM 320. The batch of unique vertices includes vertices of a subset of primitives included in the given set of primitives specified by the vertex data received from the CPU 202. Work distribution unit 300 may be configured to fetch the pointers corresponding to the processing tasks, may receive the pointers from front end 312, or may receive the data directly from front end 312. In some embodiments, indices specify the location of the data in an array. Front end 312 ensures that GPCs 308 are configured to a valid state before the processing specified by the command buffers is initiated.

A work distribution unit 300 may be configured to output tasks at a frequency capable of providing tasks to multiple GPCs 308 for processing. In some embodiments of the present invention, portions of GPCs 308 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 308 for performing different types of processing tasks efficiently accommodates any expansion and contraction of data produced by those different types of processing tasks. Intermediate data produced by GPCs 308 may be buffered to allow the intermediate data to be transmitted between GPCs 308 with minimal stalling in cases where the rate at which data is accepted by a downstream GPC 308 lags the rate at which data is produced by an upstream GPC 308.

Memory interface 314 may be partitioned into a number D of memory partition units that are each coupled to a portion of parallel processing memory 304, where D≧1. Each portion of parallel processing memory 304 generally includes one or more memory devices (e.g. DRAM 320). Persons skilled in the art will appreciate that DRAM 320 may be replaced with other suitable storage devices and can be of generally conventional design. A detailed description is therefore omitted. Render targets, such as frame buffers or texture maps may be stored across DRAMs 320, allowing partition units 315 to write portions of each render target in parallel to efficiently use the available bandwidth of parallel processing memory 304.

Any one of GPCs 308 may process data to be written to any of the DRAMs 320 within parallel processing memory 304. Crossbar unit 310 is configured to route the output of each GPC 308 to the input of any partition unit 315 or to another GPC 308 for further processing. GPCs 308 communicate with memory interface 314 through crossbar unit 310 to read from or write to various external memory devices. In one embodiment, crossbar unit 310 has a connection to memory interface 314 to communicate with I/O unit 305, as well as a connection to local parallel processing memory 304, thereby enabling the processing cores within the different GPCs 308 to communicate with system memory 204 or other memory that is not local to PPU 302. Crossbar unit 310 may use virtual channels to separate traffic streams between the GPCs 308 and partition units 315.

Again, GPCs 308 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 302 may transfer data from system memory 204 and/or local parallel processing memories 304 into internal (on-chip) memory, process the data, and write result data back to system memory 204 and/or local parallel processing memories 304, where such data can be accessed by other system components, including CPU 202 or another parallel processing subsystem 212.

A PPU 302 may be provided with any amount of local parallel processing memory 304, including no local memory, and may use local memory and system memory in any combination. For instance, a PPU 302 can be a graphics processor in a unified memory architecture (UMA) embodiment. In such embodiments, little or no dedicated graphics (parallel processing) memory would be provided, and PPU 302 would use system memory exclusively or almost exclusively. In UMA embodiments, a PPU 302 may be integrated into a bridge chip or processor chip or provided as a discrete chip with a high-speed link (e.g., PCI-Express) connecting the PPU 302 to system memory via a bridge chip or other communication means.

As noted above, any number of PPUs 302 can be included in a parallel processing subsystem 212. For instance, multiple PPUs 302 can be provided on a single add-in card, or multiple add-in cards can be connected to communication path 213, or one or more PPUs 302 can be integrated into a bridge chip. PPUs 302 in a multi-PPU system may be identical to or different from one another. For instance, different PPUs 302 might have different numbers of processing cores, different amounts of local parallel processing memory, and so on. Where multiple PPUs 302 are present, those PPUs may be operated in parallel to process data at a higher throughput than is possible with a single PPU 302. Systems incorporating one or more PPUs 302 may be implemented in a variety of configurations and form factors, including desktop, laptop, or handheld personal computers, servers, workstations, game consoles, embedded systems, and the like.

Processing Cluster Array Overview

Figure 4A:
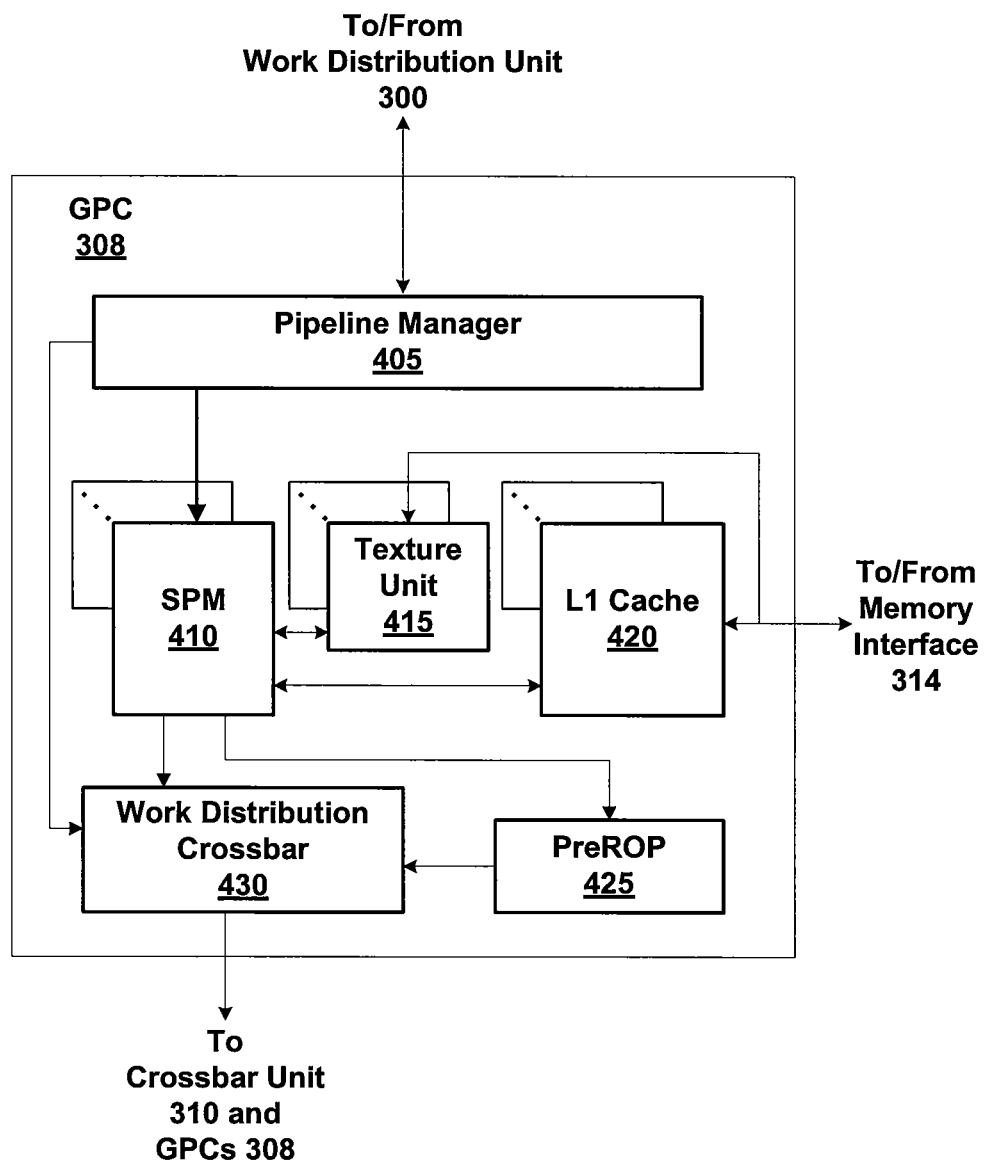
FIG. 4A is a block diagram of a GPC within one of the PPUs of FIG. 3, according to one embodiment of the present invention

FIG. 4A is a block diagram of a GPC 308 within one of the PPUs 302 of FIG. 3, according to one embodiment of the present invention. Each GPC 308 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 308. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPC 308 may be configured to implement a primitive engine for performing screen space graphics processing functions that may include, but are not limited to primitive setup, rasterization, and z culling. The primitive engine receives a processing task from work distribution unit 300, and when the processing task does not require the operations performed by primitive engine, the processing task is passed through the primitive engine to a pipeline manager 405. Operation of GPC 308 is advantageously controlled via a pipeline manager 405 that distributes processing tasks to streaming multiprocessors (SPMs) 410. Pipeline manager 405 may also be configured to control a work distribution crossbar 330 by specifying destinations for processed data output by SPMs 410.

In one embodiment, each GPC 308 includes a number M of SPMs 410, where M≧1, each SPM 410 configured to process one or more thread groups. The series of instructions transmitted to a particular GPC 308 constitutes a thread, as previously defined herein, and the collection of a certain number of concurrently executing threads across the parallel processing engines (not shown) within an SPM 410 is referred to herein as a "thread group." As used herein, a "thread group" refers to a group of threads concurrently executing the same program on different input data, with each thread of the group being assigned to a different processing engine within an SPM 410. A thread group may include fewer threads than the number of processing engines within the SPM 410, in which case some processing engines will be idle during cycles when that thread group is being processed. A thread group may also include more threads than the number of processing engines within the SPM 410, in which case processing will take place over multiple clock cycles. Since each SPM 410 can support up to G thread groups concurrently, it follows that up to G×M thread groups can be executing in GPC 308 at any given time.

An exclusive local address space is available to each thread, and a shared per-CTA address space is used to pass data between threads within a CTA. Data stored in the per-thread local address space and per-CTA address space is stored in L1 cache 420, and an eviction policy may be used to favor keeping the data in L1 cache 420. Each SPM 410 uses space in a corresponding L1 cache 420 that is used to perform load and store operations. Each SPM 410 also has access to L2 caches within the partition units 315 that are shared among all GPCs 308 and may be used to transfer data between threads. Finally, SPMs 410 also have access to off-chip "global" memory, which can include, e.g., parallel processing memory 304 and/or system memory 204. An L2 cache may be used to store data that is written to and read from global memory. It is to be understood that any memory external to PPU 302 may be used as global memory.

Also, each SPM 410 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

In graphics applications, a GPC 308 may be configured such that each SPM 410 is coupled to a texture unit 415 for performing texture mapping operations, e.g., determining texture sample positions, reading texture data, and filtering the texture data. Texture data is read via memory interface 314 and is fetched from an L2 cache, parallel processing memory 304, or system memory 204, as needed. Texture unit 415 may be configured to store the texture data in an internal cache. In some embodiments, texture unit 415 is coupled to L1 cache 420, and texture data is stored in L1 cache 420. Each SPM 410 outputs processed tasks to work distribution crossbar 330 in order to provide the processed task to another GPC 308 for further processing or to store the processed task in an L2 cache, parallel processing memory 304, or system memory 204 via crossbar unit 310. A preROP (pre-raster operations) 425 is configured to receive data from SPM 410, direct data to ROP units within partition units 315, and perform optimizations for color blending, organize pixel color data, and perform address translations.

It will be appreciated that the core architecture described herein is illustrative and that variations and modifications are possible. Any number of processing engines, e.g., primitive engines 404, SPMs 410, texture units 415, or preROPs 425 may be included within a GPC 308. Further, while only one GPC 308 is shown, a PPU 302 may include any number of GPCs 308 that are advantageously functionally similar to one another so that execution behavior does not depend on which GPC 308 receives a particular processing task. Further, each GPC 308 advantageously operates independently of other GPCs 308 using separate and distinct processing engines, L1 caches 320, and so on.

Figure 4B:
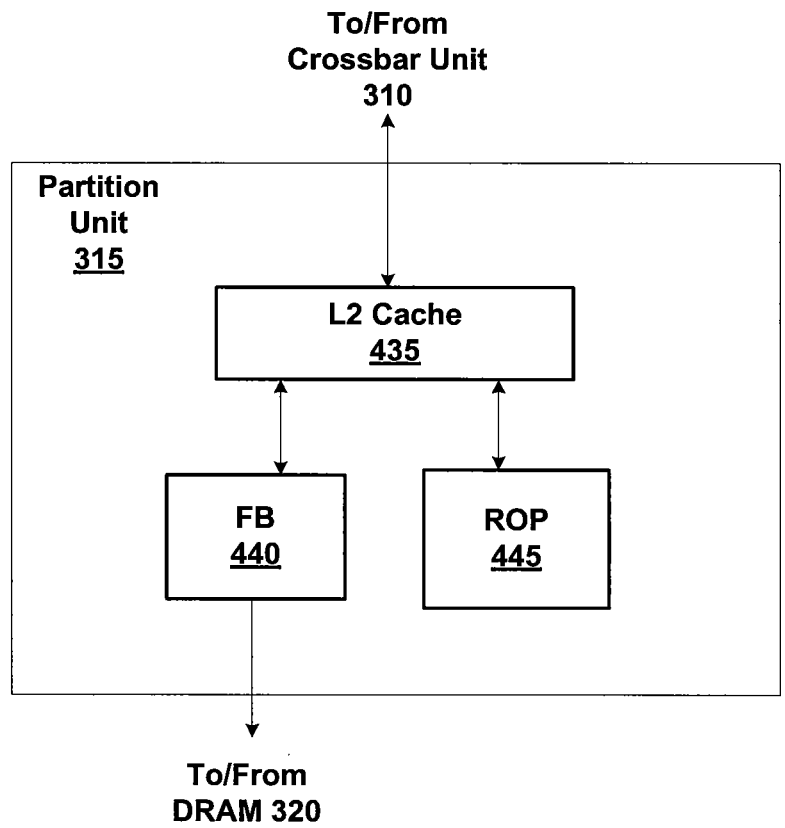
FIG. 4B is a detailed block diagram of a partition unit within one of the PPUs of FIG. 3, according to one embodiment of the present invention.

FIG. 4B is a block diagram of a partition unit 315 within one of the PPUs 302 of FIG. 3, according to one embodiment of the present invention. As shown, partition unit 315 includes a L2 cache 450, a frame buffer (FB) 440, and a raster operations unit (ROP) 445. L2 cache 450 is a read/write cache that is configured to perform load and store operations received from crossbar unit 310 and ROP 445. Read misses and urgent writeback requests are output by L2 cache 450 to FB 440 for processing. Dirty updates are also sent to FB 440 for opportunistic processing. FB 440 interfaces directly with DRAM 320, outputting read and write requests and receiving data read from DRAM 320.

In graphics applications, ROP 445 is a processing unit that performs raster operations, such as stencil, z test, blending, and the like, and outputs pixel data as processed graphics data for storage in graphics memory. In some embodiments of the present invention, ROP 445 is included within each GPC 308 instead of partition unit 315, and pixel read and write requests are transmitted over crossbar unit 310 instead of pixel fragment data.

The processed graphics data may be displayed on display device 210 or routed for further processing by CPU 202 or by one of the processing entities within parallel processing subsystem 212. Each partition unit 315 includes a ROP 445 in order to distribute processing of the raster operations. In some embodiments, ROP 445 may be configured to compress z or color data that is written to memory and decompress z or color data that is read from memory.

Persons skilled in the art will understand that the architecture described in FIGS. 2, 3, 4A and 4B in no way limits the scope of the present invention and that the techniques taught herein may be implemented on any properly configured processing unit, including, without limitation, one or more CPUs, one or more multi-core CPUs, one or more PPUs 302, one or more GPCs 308, one or more graphics or special purpose processing units, or the like, without departing the scope of the present invention.

Early Vertex Culling

The approach to early vertex culling described herein allows batches of vertices associated with primitives being processed within the graphics rendering pipeline (e.g., graphics rendering pipeline 100) that eventually would be culled by the VPC unit 116 to be identified and discarded at an earlier stage in the pipeline. Such an approach saves memory bandwidth since vertex attributes associated with the discarded vertices do not need to be retrieved from memory. The approach also reduces computational load since the discarded vertices, and, consequently, the primitives associated with those vertices, are not processed unnecessarily by the vertex shader and the geometry shader, respectively.

As described in greater detail below, a vertex shader program can be compiled such that, when executed within one of the GPCs 308 in the parallel processing subsystem 212, early vertex culling is performed. First, the functionality of a compiler configured to compile the vertex shader program into two different portions, a culling portion configured for early vertex culling and a shading portion configured for vertex lighting and transformation, is set forth. Then, the description of how the two portions of the compiled vertex shader program are executed within the system hardware of the GPC 308 is described.

Figure 5:
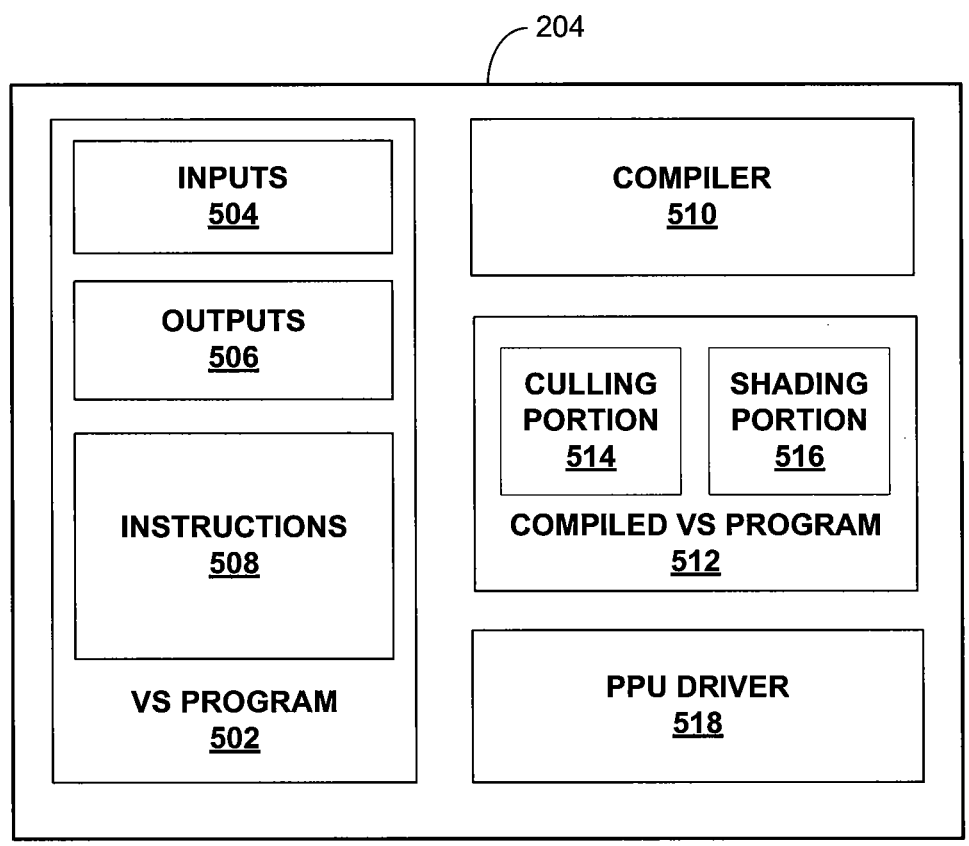
FIG. 5 is a more detailed conceptual diagram of a compiled vertex shader program configured for early vertex culling, according to one embodiment of the present invention.

FIG. 5 is a more detailed conceptual diagram of a compiled vertex shader program 512 configured for early vertex culling, according to one embodiment of the present invention. As shown, the system memory 204 of FIG. 2 includes a vertex shader (VS) program 502, a compiler 510, the compiled VS program 512 and a PPU driver 518.

As previously described herein, a 3D graphics scene is typically represented by a collection of primitives, where each primitive has three or more vertices, and each vertex having an associated set of input vertex attributes. Each of the input vertex attributes specifies a different property of the vertex. The input vertex attributes (referred to herein as "vertex data") associated with the vertices of the different primitives are stored in vertex arrays. The indices associated with these vertices are stored in index arrays. The graphics rendering pipeline is configured to generate a 2D display image of the 3D graphics scene by processing the different primitives making up the 3D graphics scene. As described herein, the graphics rendering pipeline functionality is implemented by the GPC 308.

The VS program 502 embodies a set of instructions executed within the GPC 308 for computing vertex positions, clip distances and other vertex attributes for the vertices of the different primitives making up the 3D graphics scene. As shown, the VS program 502 includes inputs 504, outputs 506, and instructions 508. The inputs 504 include the vertex attribute identifiers that identify the set of input vertex attributes needed to execute the instructions 508 on one or more vertices. The instructions 508 include instructions for computing the vertex positions, clip distances and other vertex attributes for the vertices of the different primitives making up the 3D graphics scene. The outputs 506 specify the outputs that are generated when the instructions 508 are executed on the set of input vertex attributes.

The compiler 510 is a software program associated with the parallel processing subsystem 212 that compiles the VS program 502 to generate the compiled VS program 512. The compiled VS program 512 includes a culling portion 514 that, when executed, is configured to perform early vertex culling operations on a set of vertices associated with one or more of the primitives making up the 3D graphics scene. As is well-known, typical vertex culling operations involve discarding vertices from the graphics rendering pipeline that are associated with primitives lying outside of the view frustum and/or the user clip plane(s). The view frustum is the region of space of the 3D graphics scene that appears on the display device 210. The user clip plane(s) are user-defined planes that define a viewing boundary of the 3D graphics scene. Primitives that lie outside of the view frustum and/or the user clip plane(s) are not visible as part of the final 2D display image associated with the 3D graphics scene that is generated by the graphics rendering pipeline.

When generating the culling portion 514 of the compiled VS program 512, the compiler 510 is configured to analyze the instructions 508 to identify the instructions for computing the vertex culling attributes, such as vertex positions and clip distances, needed to perform early vertex culling. The identified instructions are then inserted into the culling portion 514 of the compiled VS program 512. Further, the input vertex attribute identifiers included in the inputs 504 that are specified in the identified instructions are included in the culling portion 514 of the compiled VS program 512. These input vertex attribute identifiers correspond to the subset of input vertex attributes needed to compute the vertex culling attributes necessary to perform the early vertex culling operations on a set of vertices described herein.

The compiler 510 also inserts culling instructions into the culling portion 514 of the compiled VS program 512. When these culling instructions are executed on the subset of input vertex attributes associated with the set (or batch) of vertices undergoing early vertex culling, a clip status is generated. If the clip status indicates a "trivially rejected" status, then each of the one or more primitives associated with the set of vertices undergoing early vertex culling lies outside the view frustum or the user clip plane(s). If the clip status indicates a "trivially accepted" status, then each of the one or more primitives associated with the set of vertices lies within the view frustum and the user clip plane(s). Finally, if the clip status indicates an "ambiguous" status, then the location of each of the primitives with respect to the view frustum and/or the user clip plane(s) cannot be conclusively determined without further processing. As described in greater detail below, the clip status determines how the set of vertices is treated in later processing stages within the graphics rendering pipeline.

The compiled VS program 512 also includes a shading portion 516 that, when executed, is configured to compute vertex attributes that are needed to perform vertex lighting and transformation operations as well as other conventional vertex shading operations. The shading portion 516 of the compiled VS program 512 includes the remaining instructions 508 that were not inserted into the culling portion 514 of the compiled VS program 512, i.e., the instructions not related to computing vertex culling attributes. The shading portion 516 of the compiled VS program 512 also includes the remaining vertex attribute identifiers included in the inputs 504 that were not included in the culling portion 514 of the compiled VS program 512, i.e., the vertex attribute identifiers not corresponding to the subset of input vertex attributes needed to compute the vertex culling attributes necessary for early vertex culling.

The PPU driver 518 is a software program that is an interface between the CPU 202 and the PPUs 302 within the parallel processing subsystem 212. In alternative embodiments, the compiler 510 may be included in the PPU driver 518. For a given set of primitives being transmitted from the CPU 202 to one of the GPCs 308 within one of the PPUs 302 for processing, the vertex data and index arrays associated with the vertices of those primitives are transmitted through the PPU driver 518 to the relevant GPC 308. The compiled VS program 512, configured to perform early vertex culling operations and other necessary vertex shading operations on those vertices, is also transmitted through the PPU driver 518 to the GPC 308. The processing of the compiled VS program 512 on the vertices within the GPC 308 is described in greater detail below in FIG. 7.

Figure 6:
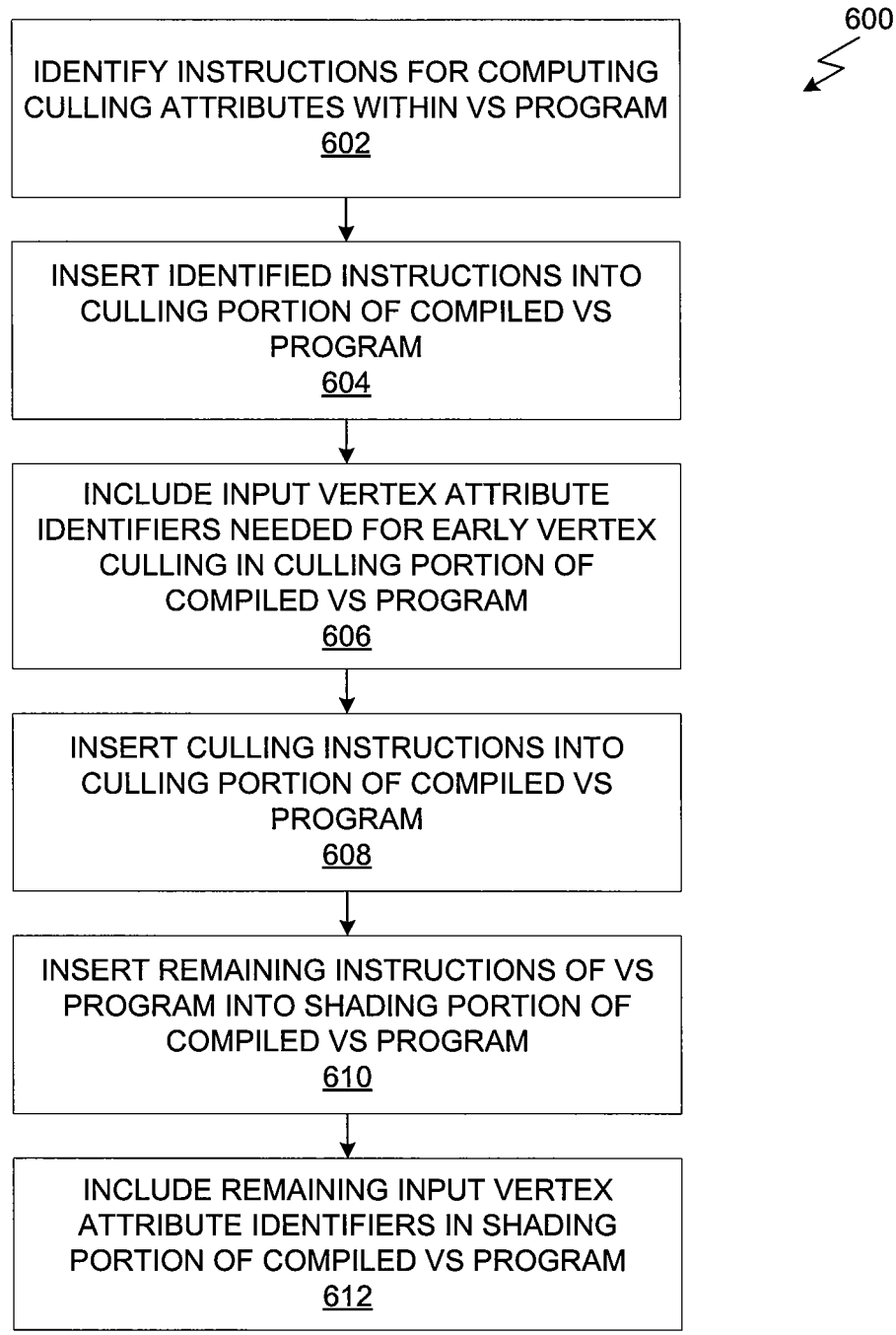
FIG. 6 is a flow diagram of method steps for generating a culling portion and a shading portion of compiled vertex shader program, according to one embodiment of the present invention.

FIG. 6 is a flow diagram of method steps for generating a culling portion and a shading portion of compiled vertex shader program, according to one embodiment of the present invention. Although the method steps are described in conjunction with the systems for FIGS. 1-5, persons skilled in the art will understand that any system configured to perform the method steps, in any order, is within the scope of the invention.

The method 600 begins at step 602, where the compiler 510 identifies instructions within the instructions 508 for computing vertex culling attributes, such as vertex positions and clip distances, needed to perform early vertex culling. At step 604, the compiler 510 inserts the identified instructions into the culling portion 514 of the compiled VS program 512. At step 606, the compiler 510 includes the input vertex attribute identifiers included in the inputs 504 that are specified in the identified instructions in the culling portion 514 of the compiled VS program 512. These input vertex attribute identifiers correspond to the subset of input vertex attributes needed to compute the vertex culling attributes necessary to perform the early vertex culling operations on a set of vertices.

At step 608, the compiler 510 inserts culling instructions into the culling portion 514 of the compiled VS program 512. When these culling instructions are executed on the subset of input vertex attributes associated with the set (or batch) of vertices undergoing early vertex culling, a clip status is generated. The clip status indicates whether the set of vertices is trivially rejected, trivially accepted, or ambiguous, as previously described herein.

At step 610, the compiler 510 inserts the remaining instructions 508 that were not inserted into the culling portion 514 of the compiled VS program 512, i.e., the instructions not related to computing vertex culling attributes into the shading portion 516 of the compiled VS program 512. At step 612, the compiler 510 also includes the remaining vertex attribute identifiers included in the inputs 504 that were not included in the culling portion 514 of the compiled VS program 512 in the shading portion 516 of the compiled VS program 512.

Figure 7:
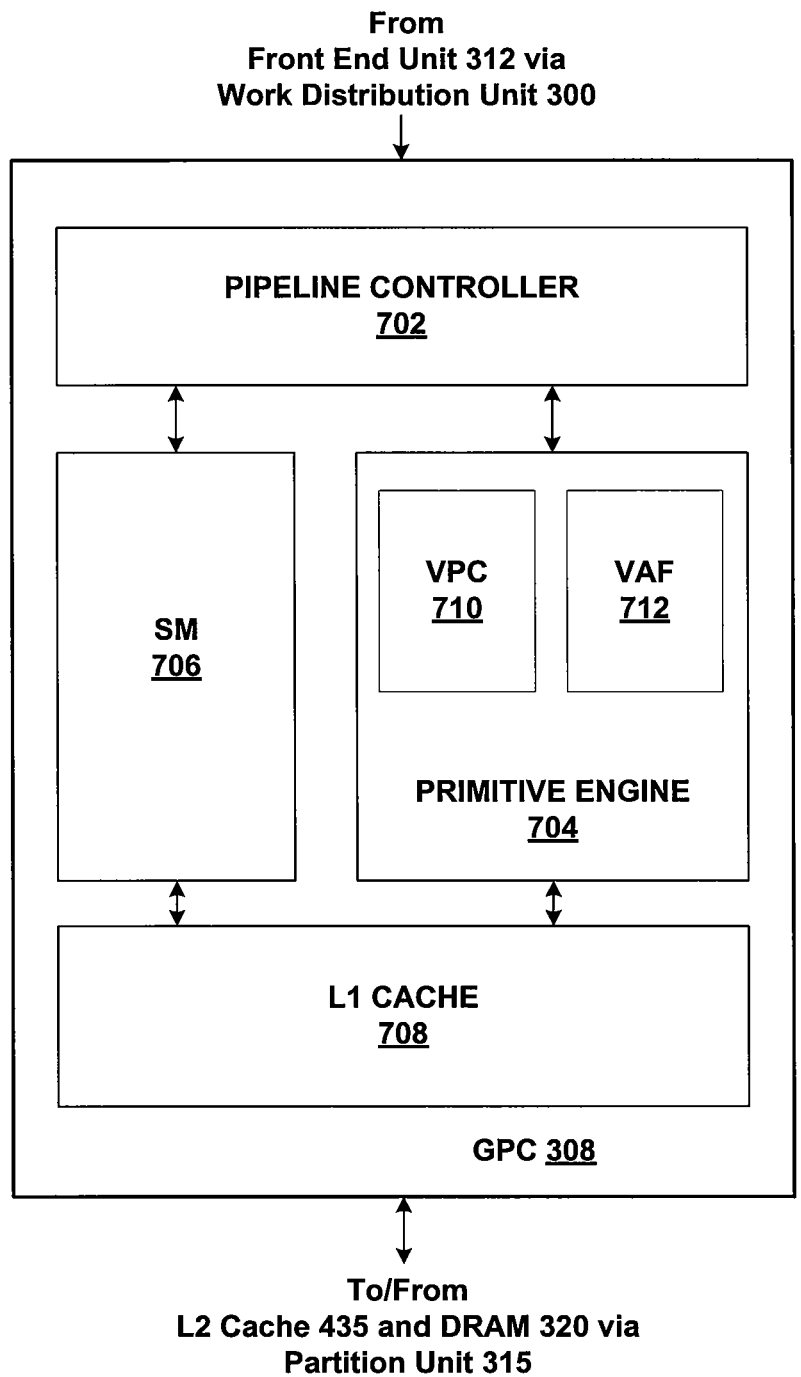
FIG. 7 is a more detailed diagram of one of the GPCs of FIG. 3 configured to perform early vertex culling operations on a batch of vertices, according to one embodiment of the present invention.

FIG. 7 is a more detailed diagram of one of the GPCs 308 of FIG. 3 configured to perform early vertex culling operations on a batch of vertices, according to one embodiment of the present invention. As shown, the GPC 308 includes a pipeline controller 702, a primitive engine 704, a shader module (SM) 706 and an L1 cache 708. The primitive engine 704 includes a viewport cull (VPC) unit 710 and a vertex attribute fetch (VAF) unit 712.

As previously described herein, for a given set of primitives transmitted from the CPU 202 to the GPC 308 for processing, the vertex data and the index arrays associated with the vertices of those primitives is transmitted through the PPU driver 518 to the parallel processing subsystem 212 and stored in the DRAM 320. The compiled VS program 512 is also transmitted through the PPU driver 518 to the parallel processing subsystem 212.

The front end unit 312 distributes the compiled VS program 512 to the pipeline controller 702 within the GPC 308 for processing on a batch of unique vertices. To determine the batch of unique vertices, the front end unit 312 also transmits a request to the index fetch unit 313 to generate a batch of unique vertices based on the index arrays stored in the DRAM 320. The batch of unique vertices includes vertices of a subset of primitives included in the given set of primitives transmitted from the CPU 202 to the parallel processing subsystem 212. The subset of primitives is determined by the index fetch unit 313 based on the index arrays. In one embodiment, all the vertices associated with a given primitive in the subset of primitives are included in the batch of unique vertices.

The pipeline controller 702 within the GPC 308 manages the execution of the culling portion 514 and the shading portion 516 of the compiled VS program 512. Upon receiving the compiled VS program 512 and a batch of unique vertices from the front end unit 312, the pipeline controller 702 initiates the execution of the culling portion 514 of the compiled VS program 512 on the batch of unique vertices. The pipeline controller 702 transmits a vertex attribute fetch request to the VAF unit 712 for retrieving the subset of input vertex attributes associated with the batch of unique vertices needed to compute the vertex culling attributes necessary to perform early vertex culling operations on the batch of unique vertices. The vertex attribute fetch request specifies the input vertex attribute identifiers included in the culling portion 514 of the compiled VS program 512. The VAF unit 712, in response to receiving the vertex attribute fetch request, retrieves the subset of input vertex attributes needed to compute the vertex culling attributes and associated with the batch of vertices from the vertex data stored in the partition unit 315. The VAF unit 712 then stores the retrieved subset of input vertex attributes in the L1 cache 708 or an L1 buffer, and transmits a notification to the pipeline controller 702 indicating that the subset of input vertex attributes are stored in the L1 cache 708 or the L1 buffer.

Upon receiving the notification from the VAF unit 712, the pipeline controller 702 launches a thread group on the SM 706 for executing the compiled VS program 512 on the batch of unique vertices. In one embodiment, the batch of unique vertices generated by the index fetch unit 313 includes thirty-two vertices, and the thread group includes thirty-two threads, where each thread executing the compiled VS program 512 on vertex attributes associated with a different vertex. In alternative embodiments, the batches of vertices and thread groups may vary in size, and more than one thread group may process a given batch of vertices.

Each thread in the thread group executes the instructions included in the culling portion 514 of the compiled VS program 512 on the subset of input vertex attributes associated with the vertex associated with the thread. As previously described herein, the execution of the instructions included in the culling portion 514 of the compiled VS program 512 across all vertices in the batch of unique vertices generates a clip status associated with the batch of unique vertices. The clip status indicates whether the batch of unique vertices is trivially rejected, trivially accepted or cannot be conclusively rejected or accepted, i.e. ambiguous. Once all threads in the thread group have completed executing the culling portion 514 of the compiled VS program 512, the SM 706 transmits the generated clip status to the pipeline controller 702.

The pipeline controller 702 determines whether to initiate the execution of the shading portion 516 of the compiled VS program 512 on the batch of unique vertices based on the clip status generated for the batch of unique vertices. When the clip status indicates a trivially accepted status or an ambiguous status, the pipeline controller 702 initiates the execution of the shading portion 516 of the compiled VS program 512 since the one or more primitives associated with the batch of unique vertices are, at least partially, inside the view frustum and the user clip plane. In such a scenario, the pipeline controller 702 transmits a second vertex attribute fetch request to the VAF unit 712 specifying the remaining input vertex attributes identifiers included in the shading portion 516 of the compiled VS program 512. The VAF unit 712, in response to receiving the second vertex attribute fetch request, retrieves the remaining vertex attributes associated with the batch of vertices from the vertex data stored in the L2 cache 435 of the partition unit 315 and/or the DRAM 320. The VAF unit 712 then stores the remaining vertex attributes in the L1 cache 708 and transmits a second notification to the pipeline controller 702 indicating that the remaining vertex attributes are stored in the L1 cache 708.

Upon receiving the second notification from the VAF unit 712, the pipeline controller 702 initiates the execution of the instructions included in the shading portion 516 of the compiled VS program 512 on the batch of unique vertices within the thread group. Each thread in the thread group executes the instructions included in the shading portion 516 of the compiled VS program 512 on the remaining vertex attributes associated with the vertex associated with the thread. Once all threads in the thread group have completed executing the shading portion 516 of the compiled VS program 512, the SM 706 transmits a completion notification to the pipeline controller 702. In response to the completion notification, the pipeline controller 702 transmits a notification including the clip status associated with the batch of unique vertices to the VPC unit 710. The VPC unit 710 processes the notification, and, upon determining that the clip status indicates a trivially accepted status or an ambiguous status, performs viewport culling operations on the thread group associated with the batch of unique vertices.

When the clip status indicates a trivially rejected status, the pipeline controller 702 determines that the execution of the shading portion 516 of the compiled VS program 512 should not be initiated since all the primitives associated with the batch of unique vertices are outside the view frustum or the user clip plane. In such a scenario, the pipeline controller 702 deactivates the threads within the thread group associated with the batch of unique vertices so that the threads perform no further processing operations on the vertices in the batch of unique vertices or associated primitives. In this fashion, the thread group is transmitted through the remaining vertex shading and the geometry shading stage to the VPC unit 710 of the graphics rendering pipeline without any additional processing being performed by the threads. The pipeline controller 702 also transmits a notification including the clip status associated with the batch of unique vertices to the VPC unit 710. The VPC unit 710 processes the notification, and, upon determining that the clip status indicates a trivially rejected status, discards the thread group associated with the batch of unique vertices. In such a manner, for a batch of unique vertices associated with one or more primitives that are culled, the remaining input vertex attributes are not retrieved from the partition unit 315, thereby conserving memory bandwidth between the GPC 308 and the partition unit 315. In addition, because the shading portion 516 of the compiled VS program 512 is not executed for the batch of unique vertices associated with the one or more primitives that are culled, the computational load on the SM 706 is reduced.

In one embodiment, the execution of the instructions included in the culling portion 514 of the compiled VS program 512 by each thread in the thread group generates a clip status associated with each vertex in the batch of unique vertices. These clip statuses may be combined to determine whether the batch of vertices is trivially rejected, trivially accepted or cannot be conclusively rejected or accepted, i.e. ambiguous. In alternative embodiments, the clip statues associated with vertices of a specific primitive can be combined to determine whether the specific primitive can be culled or not. In such embodiments, the clip status associated with each vertex is transmitted to the VPC unit 710 which can then process the entire batch of vertices based on the clip status associated with the batch of vertices or process each primitive related to the batch of vertices separately.

Figure 8A:
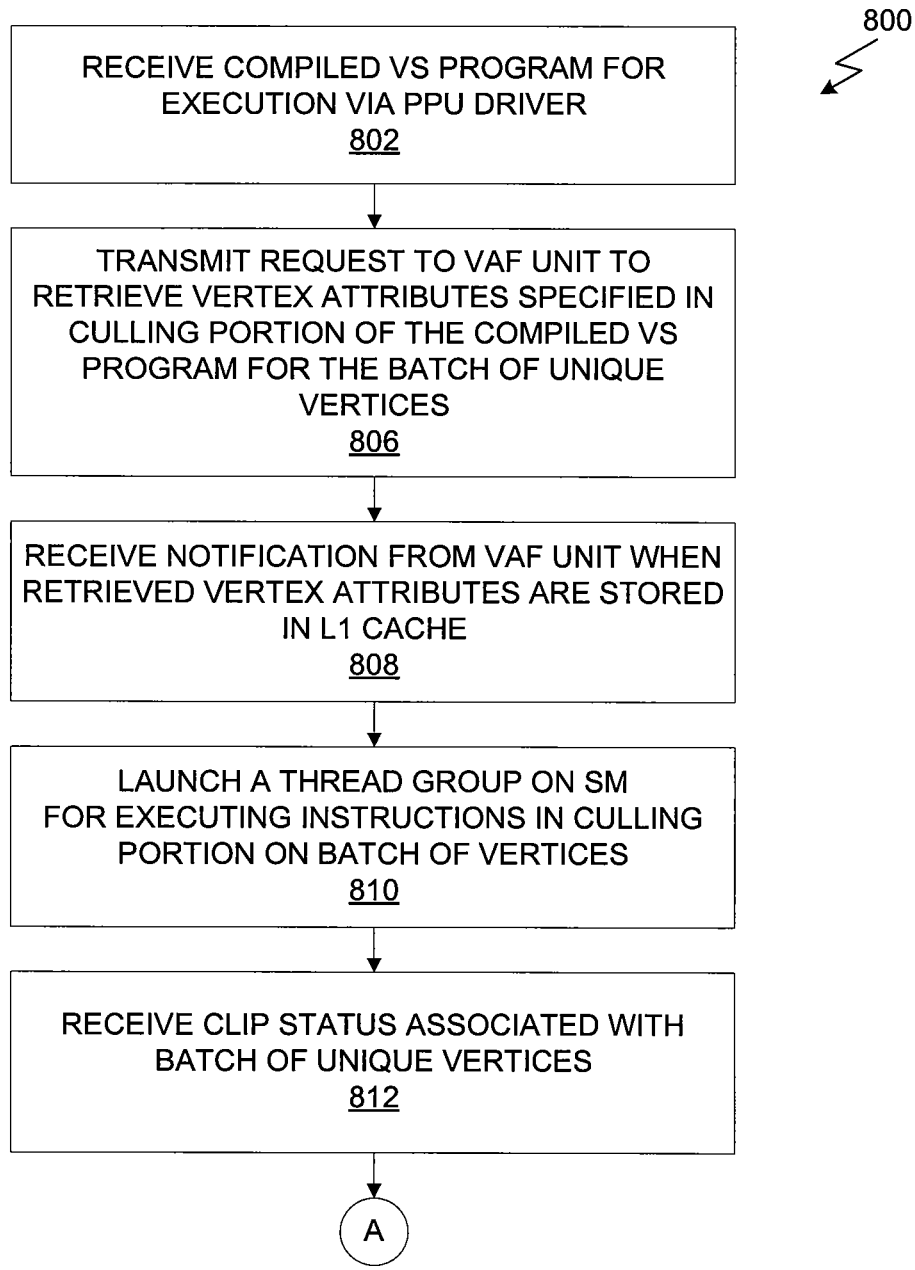
FIGS. 8A and 8B set forth a flow diagram of method steps for executing a culling portion of the compiled vertex shader program and a shading portion of the compiled vertex shader program on a GPC, according to one embodiment of the present invention.
Figure 8B:
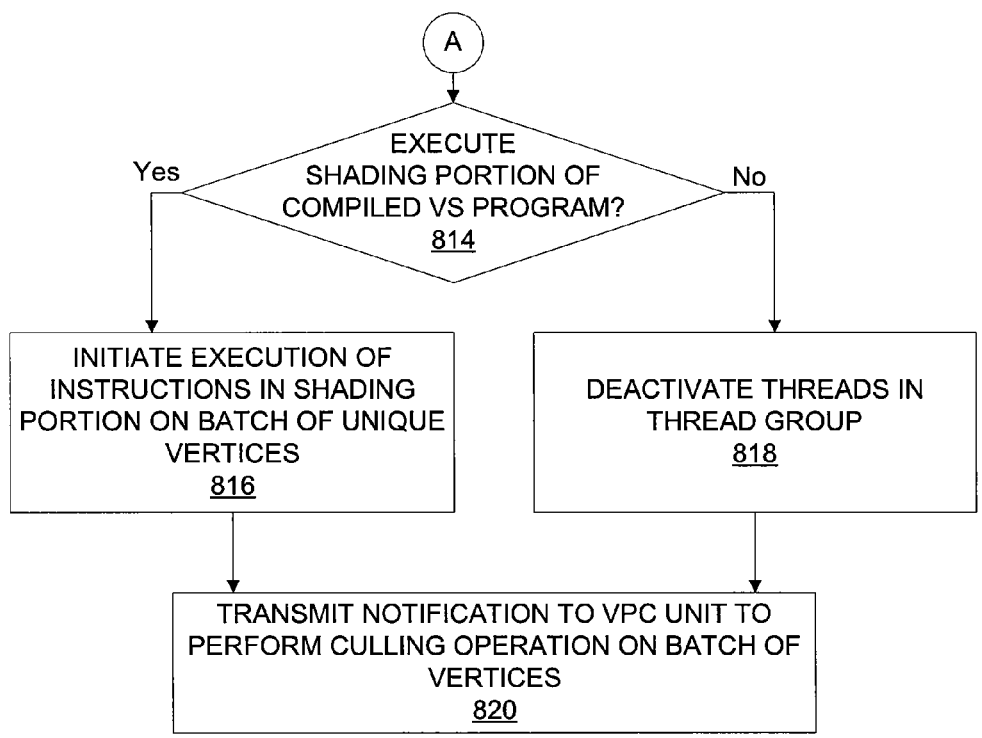

FIGS. 8A and 8B set forth a flow diagram of method steps for executing a culling portion of the compiled vertex shader program and a shading portion of the compiled vertex shader program on a GPC, according to one embodiment of the present invention. Although the method steps are described in conjunction with the systems for FIGS. 1-7, persons skilled in the art will understand that any system configured to perform the method steps, in any order, is within the scope of the invention.

The method 800 begins at step 802, where the pipeline controller 702 receives the compiled VS program 512 and a batch of unique vertices generated by the index fetch unit 313 from the front end unit 312. As previously described herein, the index fetch unit 313 generates a batch of unique vertices based on the index arrays stored in the L2 cache 435 within the partition unit 315 and/or the DRAM 320. The batch of unique vertices includes vertices of a subset of primitives included in the given set of primitives transmitted from the CPU 202 to the parallel processing subsystem 212.

At step 806, the pipeline controller 702 transmits a vertex attribute fetch request to the VAF unit 712 for retrieving the subset of input vertex attributes associated with the batch of unique vertices needed to compute the vertex culling attributes necessary to perform early vertex culling operations on the batch of unique vertices. The vertex attribute fetch request specifies the input vertex attribute identifiers included in the culling portion 514 of the compiled VS program 512. As previously described herein, the VAF unit 712, in response to receiving the vertex attribute fetch request, retrieves the subset of input vertex attributes needed to compute the vertex culling attributes and associated with the batch of vertices from the vertex data stored in the partition unit 315. The VAF unit 712 then stores the retrieved subset of input vertex attributes in the L1 cache 708.

At step 808, the pipeline controller 702 receives a notification from the VAF unit 712 indicating that the subset of input vertex attributes are stored in the L1 cache 708. At step 810, the pipeline controller 702 launches a thread group on the SM 706 for executing the compiled VS program 512 on the batch of unique vertices. As previously described herein, the execution of the instructions included in the culling portion 514 of the compiled VS program 512 across all vertices in the batch of unique vertices generates a clip status associated with the batch of unique vertices. The clip status indicates whether the batch of unique vertices is trivially rejected, trivially accepted or cannot be conclusively rejected or accepted, i.e. ambiguous. At step 812, the pipeline controller 702 receives the clip status associated with the batch of unique vertices from the SM 706.

At step 814, the pipeline controller 702 determines whether to initiate the execution of the shading portion 516 of the compiled VS program 512 on the batch of unique vertices based on the clip status associated with the batch of unique vertices. When the clip status indicates a trivially accepted status or an ambiguous status, the pipeline controller 702, at step 814, determines that the execution of the shading portion 516 of the compiled VS program 512 should be initiated, and the method 800 proceeds to step 816. At step 816, the pipeline controller 702 initiates the execution of the instructions included in the shading portion 516 of the compiled VS program 512 on the batch of unique vertices within the thread group on the SM 706.

At step 820, once the completion notification is received from the SM 706, the pipeline controller 702 transmits a notification, including the clip status associated with the batch of vertices, to the VPC unit 710 for performing further culling operations on the batch of vertices. In one embodiment, the pipeline controller 702 transmits the clip status associated with each vertex to the VPC unit 710. The VPC unit 710 can then generate a clip status associated with the batch of unique vertices by combining the clip status associated with each vertex in the batch of unique vertices, and perform further culling operations on the batch of unique vertices. In alternative embodiments, the VPC unit 710 can generate a clip status associated with each primitive by combining the clip status associated with each vertex of that primitive, and perform further culling operations on that primitive.

When the clip status indicates a trivially rejected status, the pipeline controller 702, at step 814, determines that the execution of the shading portion 516 of the compiled VS program 512 should not be initiated, and the method 800 proceeds to step 818. At step 818, the pipeline controller 702 deactivates the threads within the thread group associated with the batch of unique vertices so that the threads perform no further processing operations on the vertices in the batch of unique vertices or associated primitives. The method 800 then proceeds to step 820 previously described herein.

As previously described herein, the VPC unit 710 processes the notification including the clip status received from the pipeline controller 702. When the clip status associated with the batch of unique vertices indicates a trivially accepted status or an ambiguous status, the VPC unit 710 performs clipping and culling operations on each vertex in the batch of unique vertices. However, when the clip status indicates a trivially rejected status, the VPC unit discards the thread group associated with the batch of unique vertices. In this manner, the VPC unit 710 is able to discard the primitives associated with the batch of unique vertices in a single operation when the clip status indicates a trivially rejected status, versus processing each vertex separately when the clip status indicates a trivially accepted status or ambiguous status.

The systems and methods described herein have several associated alternative embodiments and implementation optimizations. These are set forth below.

In one alternative embodiment, the compiler 510 does not divide the compiled VS program 512 into the culling portion 514 and the shading portion 516. Instead, the compiler 510 generates a compiled VS program that comprises a single set of instructions that includes the instructions necessary for computing vertex culling attributes, the culling instructions and the remaining instructions included in the VS program 502. The pipeline controller 702 controls the execution of the alternative compiled VS program in a manner similar to that previously described herein.

In another alternative embodiment, the VS program 502 also includes load instructions for retrieving the input vertex attributes specified by the inputs 504 from the L2 cache 435 or the DRAM 320. In such an embodiment, the compiler 510 inserts the load instructions needed to retrieve the subset of input vertex attributes needed to compute vertex culling attributes necessary for performing early vertex culling operations into the culling portion 514 of the compiled VS program 512 and the remaining load instructions into the shading portion 516 of the compiled VS program 512.

In another alternative embodiment, the vertex data is transmitted to the GPCs 308 for processing along with the compiled VS program 512 and is stored in a vertex attribute buffer within the L2 cache 435. To avoid a buffer overflow in the vertex attribute buffer, all input vertex attributes associated with each batch of vertices being processed are retrieved from the vertex attribute buffer when the culling portion 514 of the compiled VS program 512 is executed.

In various alternative embodiments, the culling instructions inserted by the compiler 510 into the culling portion 514 of the compiled VS program 512 may be related to different types of culling operations resulting in a value that can be used to generate a clip status. Such culling operations may include, but are not limited to, viewport culling, user clip plane culling, backface/area culling, scissor culling and/or normal-based culling. Persons skilled in the art will understand that the techniques described herein may be implemented with any technically feasible culling operations, including those using more exotic culling parameters, such as memory address, color, or time of day, to name a few.

In an alternative implementation, a geometry shader program (executed by the geometry shader 112 previously described herein) may be compiled into a culling portion and a geometry shading portion in a manner similar to how the VS program 502 is compiled into a culling portion 514 and a shading portion 516, as previously described herein. When the SM 706 is configured to execute the compiled geometry shader program, each thread in a thread group executes the culling portion of the compiled geometry shader program on a different primitive in a batch of primitives. In such embodiments, one or more primitives can be culled before the geometry shading portion of the compiled geometry shader program is executed on those primitives, thereby leading to further processing efficiencies in the graphics rendering pipeline.

In another alternative implementation, a tessellation control shader program may be compiled into a culling portion and a shading portion in a manner similar to how the VS program 502 is compiled into a culling portion 514 and a shading portion 516, as previously described herein. When the SM 706 is configured to execute the compiled tessellation control shader program, each thread in a thread group executes the culling portion of the compiled tessellation control shader program on a different control point (a vertex included in a patch of vertices). In such embodiments, one or more control points can be culled before the shading portion of the tessellation control shader and subsequent stages, such as tessellation evaluation shader and the geometry shader are executed on the primitives associated with the patch of vertices, thereby leading to further processing efficiencies in the graphics rendering pipeline.

In another alternative implementation, a tessellation evaluation shader program may be compiled into a culling portion and a shading portion in a manner similar to how the VS program 502 is compiled into a culling portion 514 and a shading portion 516, as previously described herein. When the SM 706 is configured to execute the compiled tessellation evaluation shader program, each thread in a thread group executes the culling portion of the compiled tessellation evaluation shader program on a different tessellated vertex. In such embodiments, tessellated vertices can be culled before the shading portion of the tessellation evaluation shader and subsequent stages, such as the geometry shader, are executed on the primitives associated with the tessellated vertices, thereby leading to further processing efficiencies in the graphics rendering pipeline.

In another alternative implementation, vertex attribute fetch coherence may be effected. In such embodiments, when input vertex attributes not needed to compute vertex culling attributes are stored in an interleaved fashion with the subset of input vertex attributes needed to compute vertex culling attributes within the L2 cache 435 or DRAM 320, the input vertex attributes not needed to compute vertex culling attributes are retrieved by the VAF unit 712 along with the subset of input vertex attributes. As persons skilled in the art will recognize, retrieving interleaved input vertex attributes in this fashion saves memory bandwidth and increases overall system performance.

In another alternative implementation, vertex attributes computed when the culling portion 514 of the compiled VS program 512 is executed may be stored in a buffer that can be accessed when the shading portion 516 of the compiled VS program 512 is executed. In such embodiments, vertex attributes for executing the shading portion 516 of the compiled VS program 512, and already computed by virtue of the culling portion 514, do not have to be recomputed when the shading portion 516 is executed.

Figure 9:
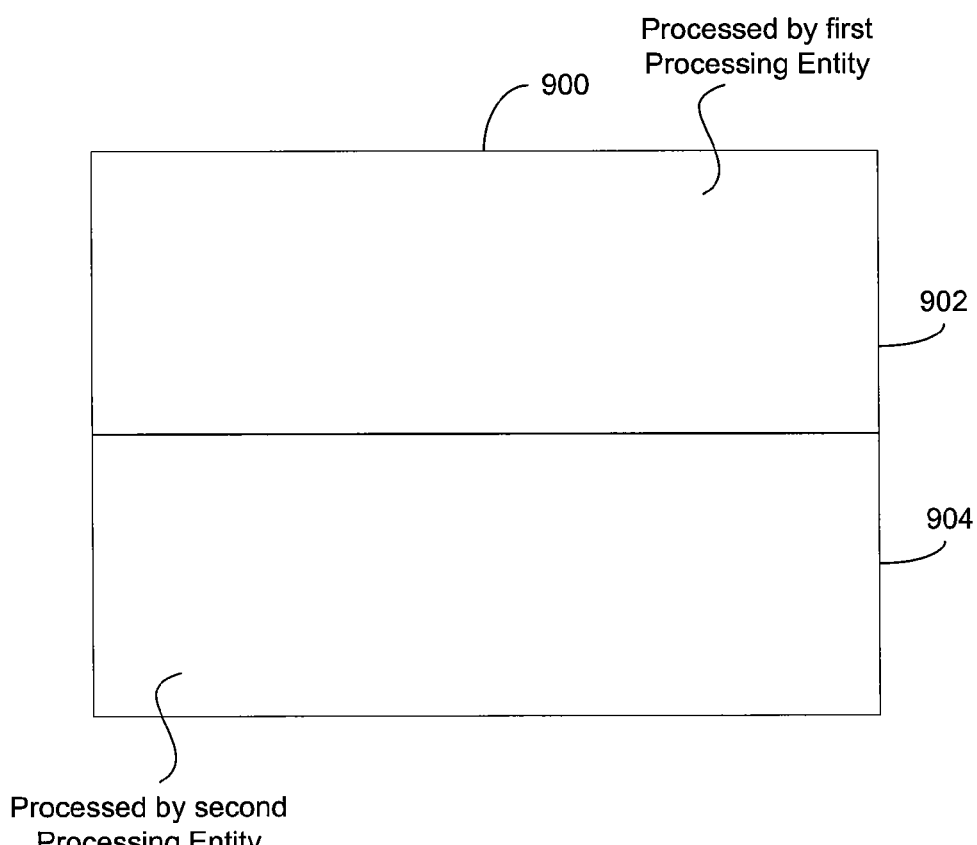
FIG. 9 is a conceptual diagram of a graphics frame split into two portions, a portion that is rendered by a first processing entity and a portion that is rendered by a second processing entity, according to one embodiment of the present invention.

In yet another implementation, the approach described herein may be applied to split frame rendering. As is well-known, split frame rendering is a technique by which a frame is split into two or more portions, and each portion is rendered by a different processing entity within the system. For example, FIG. 9 is a conceptual diagram of a graphics frame 900 split into two portions, a portion 902 that is rendered by a first processing entity and a portion 904 that is rendered by a second processing entity, according to one embodiment of the present invention. When implementing split frame rendering within the architecture set forth in FIG. 3 and FIG. 7 herein, the PPU driver 518 is configured to set up a user clip plane that reflects the split plane of the graphics frame 900. The PPU driver 518 also communicates to the processing entities within the parallel processing subsystem 212 (e.g., the GPC 308) about which portion of the graphics frame 900 is to be processed by each such processing entity. In this type of processing paradigm, when the first processing entity executes the culling portion of the vertex shader, the vertices falling in portion 904 of the graphics frame 900 are culled, and the vertices falling in portion 902 of the graphics frame 900 are processed. Similarly, when the second processing entity executes the culling portion of the vertex shader, the vertices falling in portion 902 of the graphics frame 900 are culled, and the vertices falling in portion 904 of the graphics frame 900 are processed.

In sum, a vertex shader program is compiled by a compiler into two portions, a culling portion and a shading portion. In one embodiment, the culling portion of the compiled vertex shader program specifies vertex attributes and instructions needed to determine whether a one or more primitives associated with a batch of vertices are outside the view frustum or the user clip plane. The shading portion specifies the remaining vertex attributes and includes instructions for vertex lighting and performing other operations on the vertices in the batch of vertices.

In one embodiment, when the vertex shader program is being processed by the GPC for a specific batch of vertices associated with one or more primitives, the pipeline controller first transmits an attribute fetch request to the VAF unit. The attribute fetch request, when processed by the VAF unit, causes the VAF unit to retrieve vertex attributes specified in the culling portion associated with each vertex in the batch of vertices from the frame buffer. The VAF unit then stores the vertex attributes in the L1 cache and transmits a notification to the pipeline controller indicating that the vertex attributes have been retrieved.

Upon receiving the notification from the VAF unit, the pipeline controller launches a warp on the SPM to execute the instructions included in the culling portion based on the vertex attributes stored in the L1 cache. Upon executing the culling portion, the thread group outputs a clip status associated with the batch of vertices. The clip status for the batch of vertices indicates whether the batch of vertices is trivially rejected (i.e., all primitives associated with the batch of vertices are outside of the view frustum), trivially accepted (i.e., all primitives associated with the batch of vertices are inside the view frustum) or ambiguous.

When the clip status of at least one vertex in the batch of vertices indicates that the vertex is trivially accepted or ambiguous, then the execution of the shader portion of the compiled vertex shader program within the thread group is initiated by the pipeline controller. In such a scenario, the remaining vertex attributes (specified in the shader portion) associated with the batch of vertices are retrieved by the VAF unit and stored in the L1 cache. The instructions in the shader portion are then executed by the thread group on the SPM. After the execution of the instructions in the shader program, the pipeline controller transmits a notification to the VPC unit to perform vertex culling operations on the batch of processed vertices.

When the clip status of each vertex in the batch of vertices indicates that the vertices are trivially rejected, then the shader portion of the vertex shader program is not processed by the pipeline controller. In such a scenario, the pipeline controller transmits a notification to the VPC unit that causes the VPC unit to discard the thread group and, in the interim, no further operations are performed on the batch of vertices.

One advantage of early vertex culling is that batches of vertices associated with primitives being processed within the graphics rendering pipeline that eventually would be culled by the VPC unit are discarded at an earlier stage in the pipeline. Such an approach saves memory bandwidth since vertex attributes associated with the discarded vertices do not need to be retrieved from memory. Early vertex culling also reduces computational load on the parallel processing subsystem since the discarded vertices, and, consequently, the primitives associated with those vertices, are not processed unnecessarily by the vertex shader and the geometry shader, respectively. In addition, culling vertices and associated primitives as a group, rather than individually, leads to further performance improvement.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Therefore, the scope of the present invention is determined by the claims that follow.

We claim:

1. A computer-implemented method for generating a compiled program configured to allow early culling operations related to one or more primitives in a graphics scene to be performed, the method comprising:
   generating a first portion of the compiled program that includes a first set of instructions specified in an uncompiled program for computing one or more culling attributes related to the one or more primitives and needed to perform the early culling operations related to the one or more primitives and a first set of input attribute identifiers specified in the first set of instructions;
   inserting culling instructions into the first portion of the compiled program that, when executed, generate a clip status that is based on the culling attributes associated with the one or more primitives and indicates whether the early culling operations related to the one or more primitives should be performed; and
   generating a second portion of the compiled program for performing one or more additional operations on the set of primitives, wherein the second portion includes a second set of instructions specified in the uncompiled program and a second set of input attribute identifiers specified in the second set of instructions.

2. The method of claim 1, wherein the second set of instructions includes instructions specified in the uncompiled program that are not included in the first set of instructions.

3. The method of claim 1, wherein the second set of input attribute identifiers includes input attribute identifiers specified in the uncompiled program that are not included in the first set of input attribute identifiers.

4. The method of claim 1, wherein the first set of instructions and the culling instructions included in the first portion of the compiled program and the second set of instructions included in the second portion of the compiled program comprise a single set of instructions making up the compiled program.

5. The method of claim 1, wherein the uncompiled program comprises an uncompiled vertex shader program, the compiled program comprises a compiled vertex shader program, the first portion of the compiled program is configured to be executed by graphics processing hardware on a plurality of vertices associated with the one or more primitives, the clip status indicates whether the plurality of vertices should be culled, and the second portion of the compiled program is configured to be executed by the graphics processing hardware on the plurality of vertices to perform one or more vertex shading operations on the plurality of vertices when the clip status indicates that the plurality of vertices should not be culled.

6. The method of claim 5, wherein vertex attributes associated with the first set of input attribute identifiers of vertices included in the plurality of vertices are used to compute the one or more culling attributes, and wherein vertex attributes associated with the second set of input attribute identifiers of the vertices included in the plurality of vertices are used to perform the one or more vertex shading operations on the plurality of vertices.

7. The method of claim 5, wherein the uncompiled program specifies load instructions for fetching vertex attributes associated with the first set of input attribute identifiers from memory, and load instructions for fetching vertex attributes associated with the second set of vertex attribute identifiers from memory.

8. The method of claim 7, wherein the load instructions for fetching vertex attributes associated with the first set of input vertex attribute identifiers from memory are included in the first portion of the compiled program, and the load instructions for fetching vertex attributes associated with the second set of input attribute identifiers from memory are included in the second portion of the compiled program.

9. The method of claim 5, wherein the clip status indicates that the plurality of vertices should be culled when the one or more primitives lie outside of a view frustum and/or one or more user clip planes, and the clip status indicates that the plurality of vertices should not be culled when the one or more primitives lie within the view frustum and the one or more user clip planes.

10. The method of claim 1, wherein the uncompiled program comprises an uncompiled geometry shader program, the compiled program comprises a compiled geometry shader program, the first portion of the compiled program is configured to be executed by graphics processing hardware on a plurality of primitives associated with the one or more primitives, the clip status indicates whether the plurality of primitives should be culled, and the second portion of the compiled program is configured to be executed by the graphics processing hardware on the plurality of primitives to perform one or more geometry shading operations on the plurality of primitives when the clip status indicates that the plurality of primitives should not be culled.

11. The method of claim 5, wherein the clip status indicates that the plurality of vertices should be culled when the one or more primitives fall on a first side of a user clip plane defined by a software driver that reflects a split frame boundary of a frame, and wherein vertices of the one or more primitives falling on the first side of the user clip plane are processed by a first processing unit, and vertices of the one or more primitives falling on a second side of the user clip plane are executed by a second processing unit.

12. The method of claim 1, wherein the uncompiled program comprises an uncompiled tessellation shader program, the compiled program comprises a compiled tessellation shader program, the first portion of the compiled program is configured to be executed by graphics processing hardware on a plurality of vertices associated with the one or more primitives, the clip status indicates whether the plurality of vertices should be culled, and the second portion of the compiled program is configured to be executed by the graphics processing hardware on the plurality of vertices to perform one or more tessellation operations on the plurality of vertices when the clip status indicates that the plurality of vertices should not be culled.

13. A non-transitory computer-readable medium for storing instructions that, when executed, cause a processor to generate a compiled program configured to allow early culling operations related to one or more primitives in a graphics scene to be performed by performing the steps of:

generating a first portion of the compiled program that includes a first set of instructions specified in an uncompiled program for computing one or more culling attributes related to the one or more primitives and needed to perform the early culling operations related to the one or more primitives and a first set of input attribute identifiers specified in the first set of instructions;

inserting culling instructions into the first portion of the compiled program that, when executed, generate a clip status that is based on the culling attributes associated with the one or more primitives and indicates whether the early culling operations related to the one or more primitives should be performed; and generating a second portion of the compiled program for performing one or more additional operations on the set of primitives, wherein the second portion includes a second set of instructions specified in the uncompiled program and a second set of input attribute identifiers specified in the second set of instructions.

14. The non-transitory computer-readable medium of claim 13, wherein the second set of instructions includes instructions specified in the uncompiled program that are not included in the first set of instructions.

15. The non-transitory computer-readable medium of claim 13, wherein the second set of input attribute identifiers includes input attribute identifiers specified in the uncompiled program that are not included in the first set of input attribute identifiers.

16. The non-transitory computer-readable medium of claim 13, wherein the first set of instructions and the culling instructions included in the first portion of the compiled program and the second set of instructions included in the second portion of the compiled program comprise a single set of instructions making up the compiled program.

17. The non-transitory computer-readable medium of claim 13, wherein the uncompiled program comprises an uncompiled vertex shader program, the compiled program comprises a compiled vertex shader program, the first portion of the compiled program is configured to be executed by graphics processing hardware on a plurality of vertices associated with the one or more primitives, the clip status indicates whether the plurality of vertices should be culled, and the second portion of the compiled program is configured to be executed by the graphics processing hardware on the plurality of vertices to perform one or more vertex shading operations on the plurality of vertices when the clip status indicates that the plurality of vertices should not be culled.

18. The non-transitory computer-readable medium of claim 17, wherein vertex attributes associated with the first set of input attribute identifiers of vertices included in the plurality of vertices are used to compute culling attributes associated with the plurality of vertices, and wherein vertex attributes associated with the second set of input attribute identifiers of the vertices included in the plurality of vertices are used to perform the one or more vertex shading operations on the plurality of vertices.

19. The non-transitory computer-readable medium of claim 17, wherein the uncompiled program specifies load instructions for fetching vertex attributes associated with the first set of input attribute identifiers from memory, and load instructions for fetching vertex attributes associated with the second set of vertex attribute identifiers from memory.

20. The non-transitory computer-readable medium of claim 19, wherein the load instructions for fetching vertex attributes associated with the first set of input vertex attribute identifiers from memory are included in the first portion of the compiled program, and the load instructions for fetching vertex attributes associated with the second set of input attribute identifiers from memory are included in the second portion of the compiled program.

21. The non-transitory computer-readable medium of claim 17, wherein the clip status indicates that the plurality of vertices should be culled when each of the one or more primitives lie outside of a view frustum and/or one or more user clip planes, and the clip status indicates that the plurality of vertices should not be culled when the one or more primitives lie within the view frustum and the one or more user clip planes.

22. A computer system for generating a compiled program configured to allow early culling operations related to one or more primitives in a graphics scene to be performed, the computer system comprising:
 a processing unit; and
 a memory configured to stored instructions that, when executed by the processing unit, cause the processing unit to perform the steps of:
  generating a first portion of the compiled program that includes a first set of instructions specified in an uncompiled program for computing one or more culling attributes related to the one or more primitives and needed to perform the early culling operations related to the one or more primitives and a first set of input attribute identifiers specified in the first set of instructions,
  inserting culling instructions into the first portion of the compiled program that, when executed, generate a clip status that is based on the culling attributes associated with the one or more primitives and indicates whether the early culling operations related to the one or more primitives should be performed, and
 generating a second portion of the compiled program for performing one or more additional operations on the set of primitives, wherein the second portion includes a second set of instructions specified in the uncompiled program and a second set of input attribute identifiers specified in the second set of instructions.

* * * * *